US005708469A

United States Patent [19]
Herzberg

[11] Patent Number: 5,708,469
[45] Date of Patent: Jan. 13, 1998

[54] MULTIPLE VIEW TELEPRESENCE CAMERA SYSTEM USING A WIRE CAGE WHICH SURROUNDSS A PLURALITY OF MOVABLE CAMERAS AND IDENTIFIES FIELDS OF VIEW

[75] Inventor: Louis Paul Herzberg, Monsey, N.Y.

[73] Assignee: International Business Machines Corporation, Armonk, N.Y.

[21] Appl. No.: 642,379

[22] Filed: May 3, 1996

[51] Int. Cl.$^6$ ............................................. H04N 7/00
[52] U.S. Cl. ............................ 348/39; 348/37; 348/38
[58] Field of Search ........................... 348/36–42, 46–58, 348/61, 383; 395/125; 358/87, 104

[56] References Cited

U.S. PATENT DOCUMENTS

| | | |
|---|---|---|
| 3,542,948 | 11/1970 | Wolff . |
| 3,560,644 | 2/1971 | Petrocelli et al. . |
| 4,355,328 | 10/1982 | Kulik . |
| 5,023,725 | 6/1991 | McCutchen ............................ 358/231 |
| 5,130,794 | 7/1992 | Ritchey ............................... 358/87 |
| 5,187,571 | 2/1993 | Braun et al. . |
| 5,495,576 | 2/1996 | Ritchey ............................... 395/125 |

Primary Examiner—Tommy P. Chin
Assistant Examiner—David R. Vincent
Attorney, Agent, or Firm—Douglas W. Cameron; Louis P. Herzberg

[57] ABSTRACT

A multiple position camera apparatus and method for a three-dimensional computer controlled telepresence camera system useful in surrogate travel type applications. In one embodiment, it enables a telepresence application provider to form multi-view application specific stored image sequences from up to six orthogonally positioned cameras. It furthermore enables a telepresence user to subsequently retrieve for remote viewing particular subsets of the available image sequences and/or groups of sequences via a monitoring and display system. A viewing procedure provides the user with the ability to proceed spatially and/or contiguously along any camera to camera direction. It further uses a wire cage to enable the definition and setting of the field of view of each camera.

9 Claims, 12 Drawing Sheets

| Sequence Number | MS17 | MS17 | MS17 | MS17 | MS17 | MS18 | MS18 | MS18 | MS18 |
|---|---|---|---|---|---|---|---|---|---|
| Index Number | 5131 | 5132 | 5133 | ** | 5133 | 5134 | 5135 | ** | 5135 |
| Top Camera | T5131 | T5132 | T5133 | ** | T5133 | T5134 | T5135 | ** | T5135 |
| Left Camera | L5131 | L5132 | L5133 | ** | L5133 | L5134 | L5135 | ** | L5135 |
| Front Camera | F5131 | F5132 | F5133 | ** | F5133 | F5134 | F5135 | ** | F5135 |
| Right Camera | R5131 | R5132 | R5133 | ** | R5133 | R5134 | R5135 | ** | R5135 |
| Back Camera | K5131 | K5132 | K5133 | ** | K5133 | K5134 | K5135 | ** | K5135 |
| Bottom Camera | B5131 | B5132 | B5133 | ** | B5133 | B5134 | B5135 | ** | B5135 |
| Time of Day | 11:13:20 | 11:13:21 | 11:13:22 | 11:13:21 ↑↑ | 11:13:22 ↑↑↑ | 11:13:22 | 11:13:23 | ↑↑ | 11:15:02 ↑↑↑ |
| Time Elapsed | 6321 | 6322 | 6323 | 6443 | 6443 | 6444 | 6445 | ↑ | 6544 |

** INDICATES CELL HELD AT SAME READING AS PREVIOUS CELL

↑ INDICATES CELL GROUP CHANGING AT ONE SECOND INCREMENTS

FIG. 8

MULTIPLE VIEW TELEPRESENCE CAMERA SYSTEM USING A WIRE CAGE WHICH SURROUNDSS A PLURALITY OF MOVABLE CAMERAS AND IDENTIFIES FIELDS OF VIEW

FIELD OF THE INVENTION

The present invention relates to the field of telepresence, in which an application useful for purposes such as surrogate travel is formed. It is particularly concerned with a multiple view camera system that is computer monitored and controlled.

BACKGROUND OF THE INVENTION

As used herein, telepresence is a technology that makes available a simulated representation of a particular site, phenomenon and/or groups thereof. The representation is generally formed and used via a multimedia medium for viewing and/or listening. It enables a user to view and/or listen to the representation at a location remote in time and place from the particular site, phenomenon and/or group thereof. The representation is herein referred to as a telepresence application. The multimedia medium is referred to as an application medium. The assembler, manufacturer and/or originator of the telepresence application is referred to as the application provider. A typical telepresence application may be a representation of a visit to a museum; zoological or amusement park; archeological dig; city center; concert or opera hall; architectural structure or bridge; or an industrial, governmental, educational or corporate campus or laboratory. It is used by a user to remotely travel the application site and/or phenomenon. The so formed application is sometimes referred to as a surrogate travel provision in that it enables a user to simulate a visit to the application site.

A telepresence application is generally formed by an application provider employing a camera monitoring the application site. In some situations multiple cameras may be employed. Multiple camera systems have long been generally employed in various, mostly two dimensional, monitoring configurations. Methods were developed to combine and use the multiple outputs together in a way to provide a user a combination of these multiple outputs.

For description purposes a camera's lens is referred to as the camera's input. The camera input views the spatial image environment observed through its opened lens. Image data are formed from the observed viewing environment. When more than one camera is employed, the entire viewable spatial environment forms the camera system's total field of view. The spatial viewing environment of a particular camera is referred to as that camera's input field of view. A central point about which a camera system views its surrounding environment is referred to herein as the viewing reference point.

In many TV cameras the camera input is converted to an electrical signal. This electrical signal is referred to as the camera's output signal. In the United States the electrical signal meets the specifications of the NTSC standard analog TV signal. In many utilizations the electrical signals are converted into a digital format.

This allows the signals to be stored in digital storage media. For the purposes of the present invention, reference is generally made to a storage format. However, the inventive concept is applicable to any video type of analog and digital storage format.

An activated video camera monitors its input field of view in a time continuum until it is deactivated. The resulting images are stored and said to form a viewing sequence. In a case where two cameras are activated simultaneously, a continuous viewing sequence can also be formed when switching between cameras. This requires that the two cameras have fields of view that have a common edge. Cameras that have a common edge are said to have adjacent fields of view. The adjacency is formed along the common edge. In this situation, a continuous viewing sequence results when a user transfers from viewing one camera's output to viewing another camera's output by passing through the common edge. For a fixed camera system this corresponds to a simulation of a user turning in the direction essentially perpendicular the common edge.

Previously, a telepresence application was generated via a camera photographing a time sequence of the viewing field of the camera lens. Generally, the application provider forms a desired sequence of images by moving the camera in space to change the image being viewed in the camera's field of view. The resulting time and space sequence of images was generally made available in the form of a film and/or a video cassette for subsequent viewing by a user. The field of view would include either moving and/or still objects.

Telepresence applications were later enhanced by making available various panoramic viewing sequences resulting from more sophisticated multiple camera and projection systems. Such systems provide essentially a limited viewing range covering viewing portions upwards of a 360 degree space along a single X-Y plane. In some cases when multiple cameras were used, the implementations were further directed to combining the views from two or more cameras to provide a panoramic projection for sophisticated viewing.

U.S. Pat. No. 3,542,948 is directed to a panoramic display system in which a plurality of television cameras is fixed to a first rotating drum to furnish video information to projectors on a second drum in a way that projects a scene covering a 360 degree field of view.

U.S. Pat. No. 3,560,544 is directed to a plurality of TV cameras to survey a seascape and a plurality of ship models so as to furnish video information. The information is combined into a picture of ships maneuvering on a seascape background and displayed. In this patent all the cameras are positioned on a single plane relative to less than a 360 degree field of view. U.S. Pat. No. 4,355,328 is similarly directed to a 360 degree closed circuit television system.

U.S. Pat. No. 5,023,725 is directed to a "method and apparatus for a dodecahedral imaging system". The system is "designed for a compound camera and projector system . . . for the photography and projection of apparently continuous images across the interior surface of a dome or spherical theater." It is concerned with combining camera outputs in a viewer transparent manner to project a panoramic view of a wide multi-camera viewing environment.

U.S. Pat. No. 5,187,571 is directed to a "television system for displaying multiple views of a remote location." It includes a sending station which "comprise a sequence of cameras (1, 2, 3, . . . , N) arranged so that the fields of view merge contiguously to form an aggregate field of view." It has a composing station that "includes circuitry that enables a local viewer at a receiving station to select an arbitrary and continuously variable subsection of the aggregate field of view for display." In this patent also all the cameras are positioned essentially on a common plane together covering "the aggregate field of view" of up to 360 degrees.

There is therefore a need for an advanced telepresence system that provides to a user the ability to better simulate a personal visit to the application site or application phenomenon. It should be able to satisfy a user's personal desires and priorities so as to provide many attributes of a real visit to the application site. This includes the ability to obtain selective viewing of particular image sequences for short or extended 'visit' durations. It should also provide the facility to view a site in any direction with the ability to change the direction being viewed from one direction to another. It would preferably also show several views simultaneously with substantially spatial contiguity from view to view. Thus an advanced telepresence system requires a functional system satisfying these very distinctive and unique computer controlled camera and display system requirements.

SUMMARY OF THE INVENTION

The present invention is a computer controlled and monitored telepresence camera and display system. It is useful in surrogate travel type applications. In one embodiment, it enables an application provider to form application specific stored image sequences from up to six orthogonally positioned cameras. It furthermore enables a user to subsequently retrieve the application for remote viewing particular subsets of the available image sequences and/or groups of sequences via a computer system. The user has the ability to proceed contiguously along any of upwards of four directions. The invention provides distinct telepresence attributes employing a computer monitored and controlled camera system directed at an X-Y-Z, total, or quasi total, viewing environment that includes front, back, right, left, up and down. Although not necessarily, this is shown in an implementation using a camera system capable of monitoring six orthogonal positions. These positions correspond to the viewing field representing front-ward, backward, right-ward, left-ward, upward (top) and downward (bottom) camera field of views relative to a viewing location.

A broad aspect of the present invention is to provide a multi-view camera apparatus comprising a plurality of cameras. The plurality of cameras monitors a total field of view. Each camera has a camera input, a camera output and a camera input field of view. Each camera is positioned at a position to monitor at its input a viewing portion of the total field of view. The camera viewing portion of each camera is space-contiguous with the viewing portion of at least one other camera. The camera outputs are fed to a processing device which processes, marks and causes the camera output from each camera to be stored.

In a particular aspect of the present invention, the camera apparatus is mounted on a roving land, air and/or sea vehicle. In a more particular aspect of the present invention, the camera apparatus is mounted on a mast carried on the roving vehicle. In another particular aspect of the present invention, the plurality of camera outputs form a group of viewing sequences in which a processing device makes available a plurality of the viewing sequences for a telepresence application to be viewed by a user.

Still another particular aspect of the present invention is the selection of cameras from a group consisting of three, four, five and six cameras. Each camera is positioned differently such that the input field of view of each camera is substantially at right angles to the input field of view of at least one other selected camera.

Another particular aspect of the present invention, is a camera and display apparatus in which a plurality of the camera outputs forms a plurality of telepresence viewing sequences formed into a telepresence application such that a computerized display controller device enables a viewer to select and view a group of viewing sequences. Each sequence comprises a continuum of the same, adjacent or opposite camera input field of view.

Still another particular aspect of the present invention, is a camera apparatus in which a plurality of cameras is positioned differently such that the field of view of each camera is a face representing a side of a polyhedron. Still another particular aspect of the present invention, is a camera apparatus where: the processing device identification and marking are used by an editor for making up a specific application; and/or where the identification and marking are used by an application user for selecting from said stored camera outputs; and/or where an application user selects from sequences from the stored camera outputs; and in which the user is able to view and switch among the stored camera position output data. Another broad aspect of the present invention is a camera apparatus further comprising one or more display units to enable a user to view two or more stored camera position outputs simultaneously.

Another broad aspect of the present invention is a camera apparatus in which a plurality of cameras is positioned in space. Each camera input is positioned differently such that the field of view of each camera is subdivided into viewing portions such that each viewing portion representing a side of a polyhedron. The apparatus further comprises a wire body having a number of faces, where the number of faces is equal to the number of sides of said polyhedron. Each wire cage face has a face periphery. The wire cage is formed by wire-like material running along the periphery of each face so as to define the face. The wire cage is mounted to surround the plurality of cameras such that the viewing portion of each of said cameras monitors a face of the wire cage. The face being positioned opposite to the camera input. In one embodiment the face is positioned at right angles to the camera input. The wire periphery may be used to define the minimum viewing portion of the camera monitoring that face.

In a particular aspect of the present invention, the camera apparatus further comprises a wire cage having six faces. The apparatus has a plurality of cameras selected from a group consisting of three, four, five and six cameras. The camera inputs are positioned such that the input field of view of each camera is substantially at right angles to the input field of view of at least one other camera.

Still another broad aspect of the present invention is a method employing a plurality of cameras having a total field of view. Each camera has a camera input, a camera output and a camera input field of view. Each camera is positioned so that its viewing portion is space-contiguous with the viewing portion of at least one other camera. The camera outputs are fed to a processing device. The processing device processes the camera outputs so as to mark and cause the camera outputs to be stored. In a particular aspect of the present invention, the method further comprises the step of making available the selection of a plurality of viewing sequences for viewing.

Still another particular aspect of the present invention, is a view monitoring method employing a plurality of cameras having a total field of view. The method is comprised of the steps of positioning each of the cameras to monitor at the input a viewing portion of the total field of view such that each the viewing portion is space-contiguous with the viewing portion of at least one other of the cameras, and mounting the plurality of cameras such that in an XYZ rectangular coordinate system at least one the viewing portion is essentially facing an X-Y plane, a second viewing portion is essentially facing an X-Z plane, and a third viewing portion is essentially facing the Y-Z plane.

In one embodiment, the method further includes the steps of processing, marking and storing the output of the cameras to form a telepresence application, and/or the step of forming an application using procedure for a user of the application to use, select and view a plurality of viewing sequences from the telepresence application, and/or the step of providing a means for the user to simultaneous view a plurality of viewing sequences from at least two of the cameras, and/or the steps of surrounding the cameras with a wire cage having a plurality of wire faces; positioning one of the wire faces substantially opposite to the input of each of the cameras; and setting the viewing portion of the input of each of the cameras in correspondence with one of the wire faces.

Still another particular aspect of the present invention, is the view monitoring method in which the total field of view includes an object surrounded by the cameras, and the input of each of the cameras is positioned to look inward toward the object. In one embodiment the method further comprises the steps of: surrounding the object with a wire cage mounted between the object and the cameras, the wire cage having a plurality of faces; positioning each of the faces opposite to the input of one of the plurality of cameras; and setting the viewing portion of the input of each of the cameras in correspondence with one of the faces. In one embodiment the wire cage has a wire periphery which includes at least one image plate.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 8 shows a storage and marking system for the present invention.

DETAILED DESCRIPTION

Figure 1:
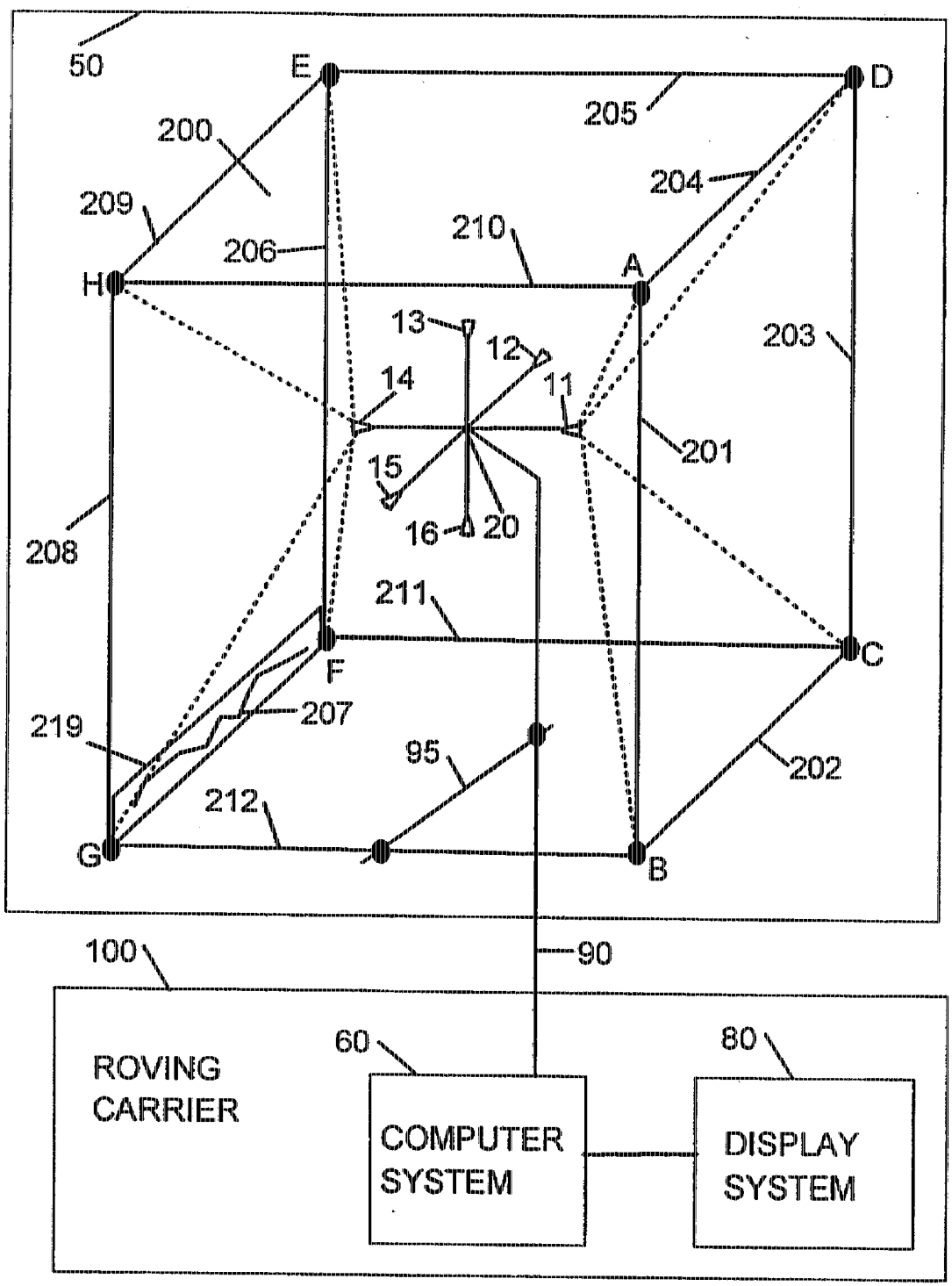
FIG. 1 shows an outwardly directed telepresence system in accordance with the present invention.
Figure 2:
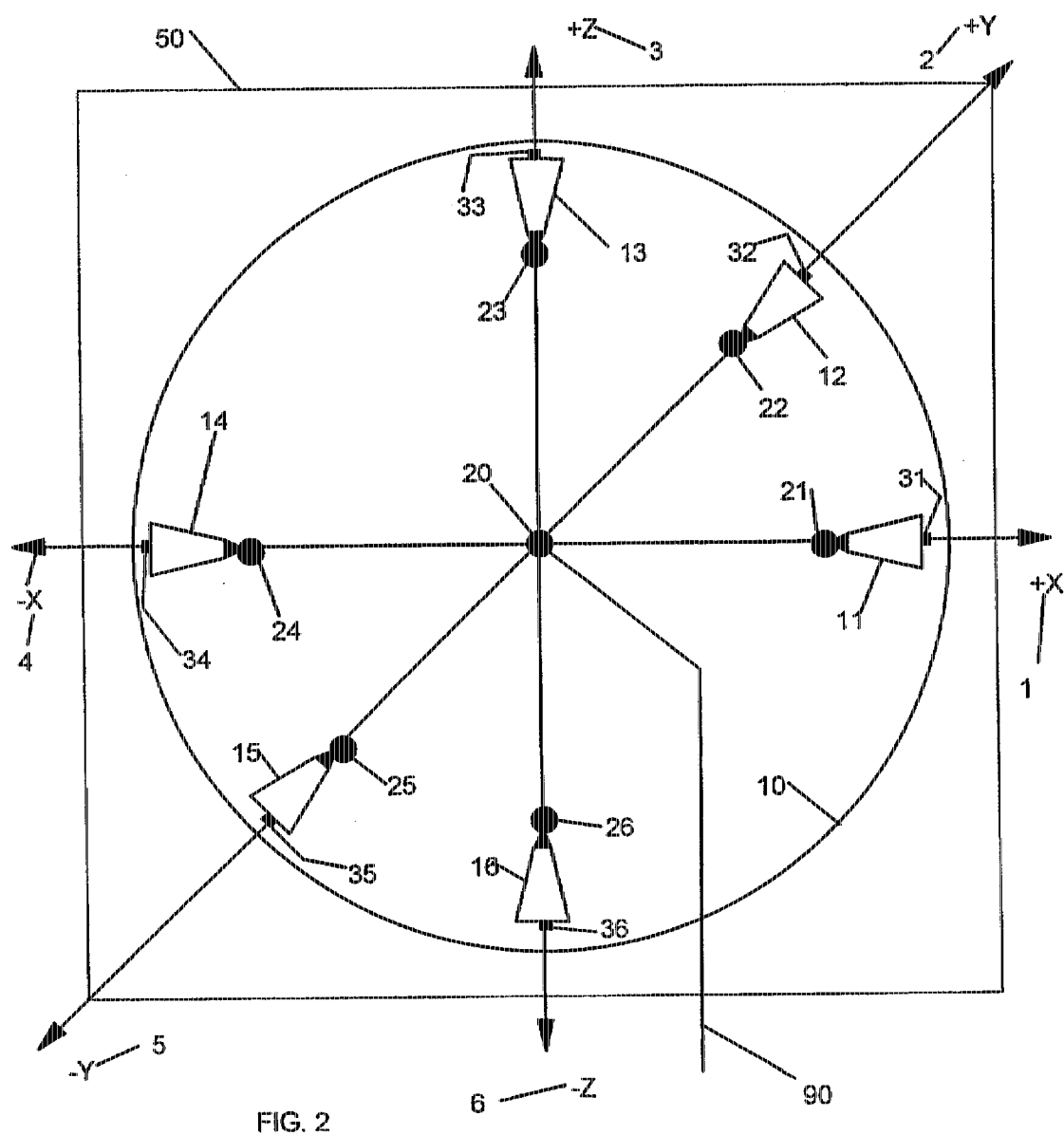
FIG. 2 shows an expanded view of the six cameras of FIG. 1.

An embodiment of the present invention is shown in FIG. 1. FIG. 1 shows a camera system 50 including six cameras 11–16 mounted symmetrically about a reference point 20, enclosed within a wire cage 200, supported by a hollow mast 90, and mounted on a roving vehicle 100. The roving vehicle 100 contains a computer system 60 that controls the camera system 50, receives processes and stores the camera system 50 output to form a telepresence application. Also shown, is a display system 80 upon which the formed application can be viewed. Generally, the display system 80 need not be mounted on the roving vehicle 100. Cameras 11–16 are desirably mounted symmetrically about a reference point 20 and positioned at right angles to each other. FIG. 2 shows an expanded view of the six outwardly looking cameras 11–16 at positions 21–26.

It is a particular aspect of the present invention, that the cameras be positioned such that together they provide views along three-dimensions. For purposes of illustration and ease of description, the camera positions shown correspond to the standard axes of a three-dimensional rectangular coordinate system having axes +X 1, –X 2, +Y 3, –Y 4, +Z 5 and –Z 6. Thus in the X-Y-Z rectangular coordinate system, at least one camera essentially faces an X-Y plane, at least one other camera essentially faces an X-Z plane and at least still another camera essentially faces a Y-Z plane.

At each position one or more cameras may be pointed to monitor a portion of the entire viewing environment 10 that is outward from the reference point 20. With this configuration, for example, top views along the +Z axis 5, and bottom views along the –Z axis 6, may be monitored along with any or all of the four orthogonal views covering 360 degrees in one horizontal X-Y plane.

The monitoring camera optical inputs 31–36, also referred to as inputs, are directed outward to view the three-dimensional outer environment 10 surrounding the six cameras 11–16. The camera outputs 41–46 are generally electrical signals containing the monitored image data. Each camera's input 31–34 is positioned to view the outward viewing environment in a different axial direction. In this case: the input of camera 11 is directed along the +X axis; the input of camera 12 is directed along the +Y axis; the input of camera 13 is directed along the +Z axis; the input of camera 14 is directed along the –X axis; the input of camera 15 is directed along the –Y axis; and the input of camera 16 is directed along the –Z axis.

As shown in FIG. 1, each camera is mounted such that its optical input is directed outward to view a face of the wire cage 200. The wire cage 200 is formed of twelve wires 201–212, made of wire-like material, and connected at corners A,B,C,D,E,F,G and H, forming the six transparent faces of a wire cube. The wire cage 200 is mounted to the mast 90 with a support wire 95. The input of camera 11 is directed at the wire cage 200 face having corners ABCD, camera 12 faces CDEF, camera 13 faces ADEH, camera 14 faces EFGH, camera 15 faces ABGH and camera 16 faces BCFG. The wire cage 200 is said to encompass the total viewing area viewed outward from point 20. This forms the camera system's total field of view. Each camera monitors a portion of this total field of view. The flattened conical area radiating from the central point 20 through one face of wire cage 200 forms a camera's input field of view. Thus, the input field of view of camera 11 is included by the view observed from the reference point through face ABCD, that of camera 12 is included in CDEF, and so on.

As used herein, wire-like material includes continuous or non-continuous material, similar to or differing from wire. It may be solid, perforated, narrow, wide, thick, thin, transparent, translucent and/or opaque. It may include text and/or image information. The faces of the wire cage 200 may be used for mounting optical filters to achieve special photographic effects. Any or all of the wire-like material face periphery may be used to contain an image plate 219 of a logo, provider name, application title or advertisement and become inserted in the field of view of one or more cameras directed toward that face.

Each camera is desirably an NTSC type video camera having an electrical camera output. In some case the cameras employed are PAL or another type of video camera. All the received image data are fed from the camera outputs toward the central point 20 and passed through the hollow mast 90 and fed to the computer system 60. Besides receiving, processing and storing the camera outputs, the computer system 60 may also control the optical input field of view of each camera 11-16, by setting such items as lens zoom and focus. The roving vehicle 100 moves from one viewing position to another causing movement of the reference point 20. All the while the cameras are generally activated and monitoring their input fields of view.

The telepresence system of FIG. 1, thereby provides computer controlled site monitoring in three-dimensions. An application provider may choose to monitor less than all six orthogonal directions depending on the application site. The particular cameras chosen monitor the desired application environment and feed the collected electrical image data to the computer system 60. The computer system 60 receives, processes and stores the data. The camera system 50 is preferentially but not necessarily mounted on a mast 90 mounted on a land, sea or air based vehicle 100. The vehicle carries the camera system 50 from reference point to reference point. The stored data is available for retrieval by a user on the display system 80. The application user is given the option to select which of the directions to view, and can switch from one available direction to another available direction along the travel of the roving vehicle 100. As is described subsequently it is desirable that the display system include a plurality of displays and be capable of displaying simultaneously any combination of the available telepresence application supplied viewing directions.

Camera positions are essentially related to the central viewing reference point 20. The reference point is preferably in the center of a six sided polyhedron that encompasses the six camera positions. The wire cage 200 is only one embodiment. For an application of a tour along a scenic route, the camera system is preferably mounted on a mast 90 on a roving carrier 100. A tall mast would be one way to enable meaningful downward views. The mast is desirably made of a relatively transparent material such as clear plastic to minimize its blocking the viewing environment. In the alternative the mast assembly is positioned centrally between the viewing environment of two adjacent cameras along the common edge interface. Use of a roving vehicle 100 is one embodiment for moving the camera system 50 from one reference point to another reference point. Generally, a large group of reference points would follow along a space continuum to provide spacial continuity of the sequence of images. In an application involving moving images, a time monitoring continuum is also usually important.

Thus, the present invention includes provision of a three-dimensional computer controlled and monitored telepresence camera and display system. It is particularly useful in surrogate travel type applications. It enables an application provider to form application-specific stored image sequences from up to six orthogonally positioned cameras. It furthermore enables an application user to subsequently retrieve the application to remotely view particular subsets of the available image sequences and/or groups of sequences via a computerized controller system. Since each viewing field is adjacent to four other viewing fields, the user has the ability to proceed contiguously along any of upwards of four directions.

Figure 3:
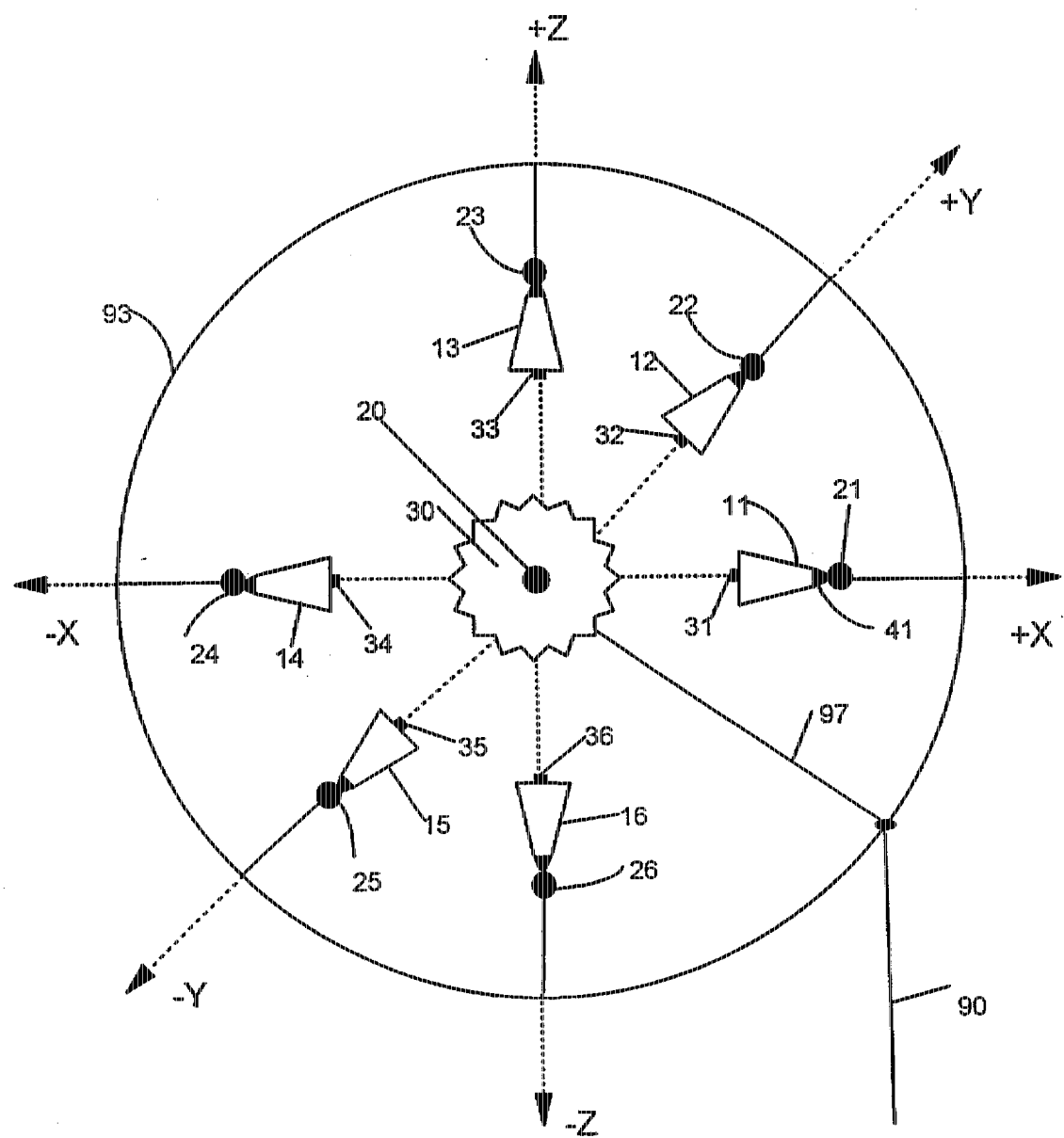
FIG. 3 shows a configuration similar to that of FIG. 2, except that the cameras are pointing inward toward the reference point for viewing all the orthogonal view of an object essentially at the reference point.

There are many embodiments for the present invention. Alternate camera systems may be employed. As an example, FIG. 3 shows a camera system 51 configuration where one outwardly looking camera 11 is used and positioned sequentially in each of up to six orthogonal positions 21-26 at each reference point 20. This is most appropriate for application viewing non-moving site.

Figure 4:
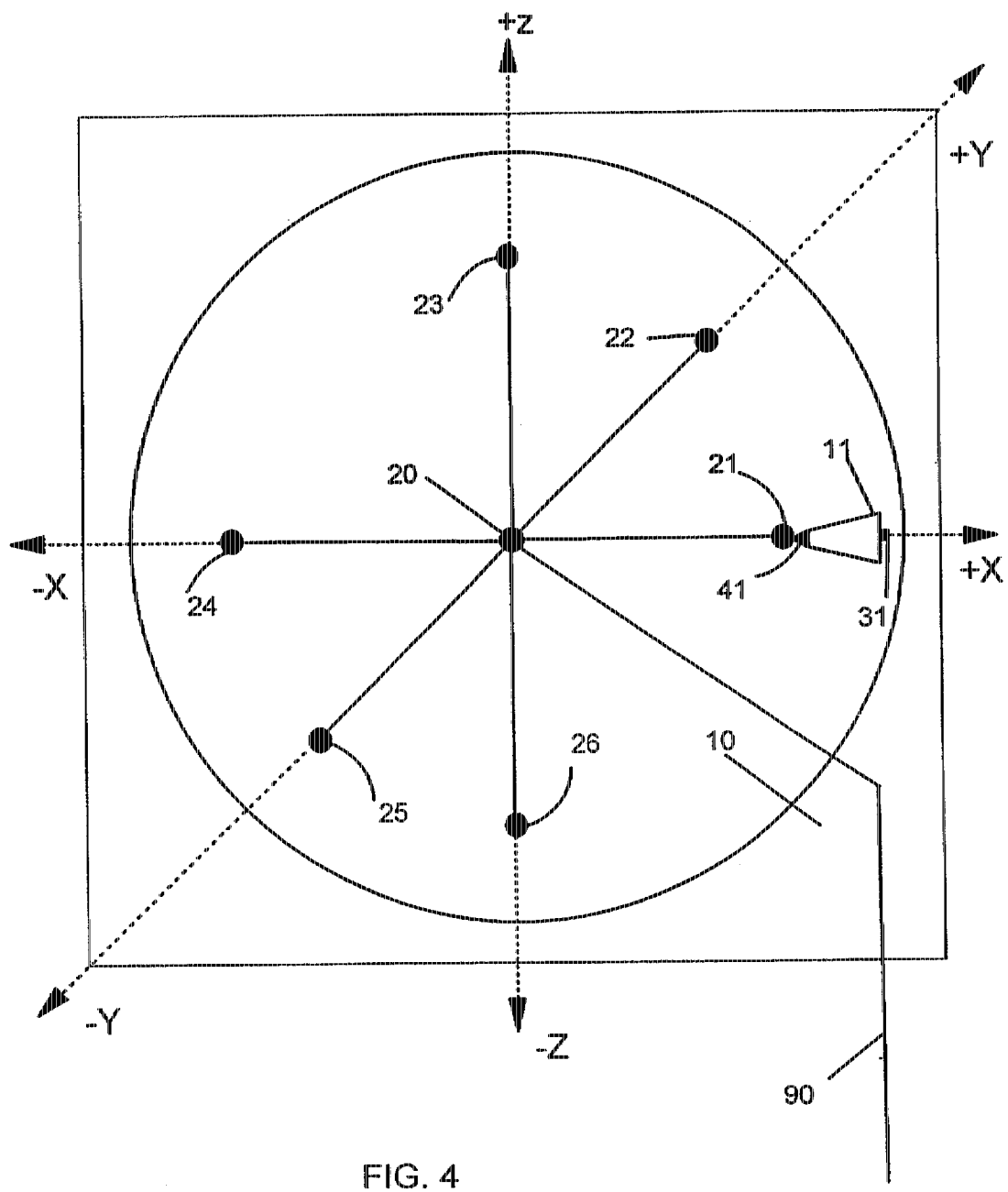
FIG. 4 shows a camera configuration where one outwardly directed camera is used and positioned sequentially in each of up to six orthogonal positions of FIG. 1 according to the present invention.

FIG. 4 shows a camera system 52 configuration having six cameras 11-16 pointing inward toward the reference point 20 to enable simultaneous monitoring of up to all six orthogonal viewing images of an object 40 actually or essentially at the reference point 20 from each of the orthogonal positions 21-26. The camera outputs 41-46 emanate from the camera back ends at positions 21-26 and are fed to support ring 93 and down the mast 90. The object is supported by support wire 93 attached to mast 90.

Figure 5:
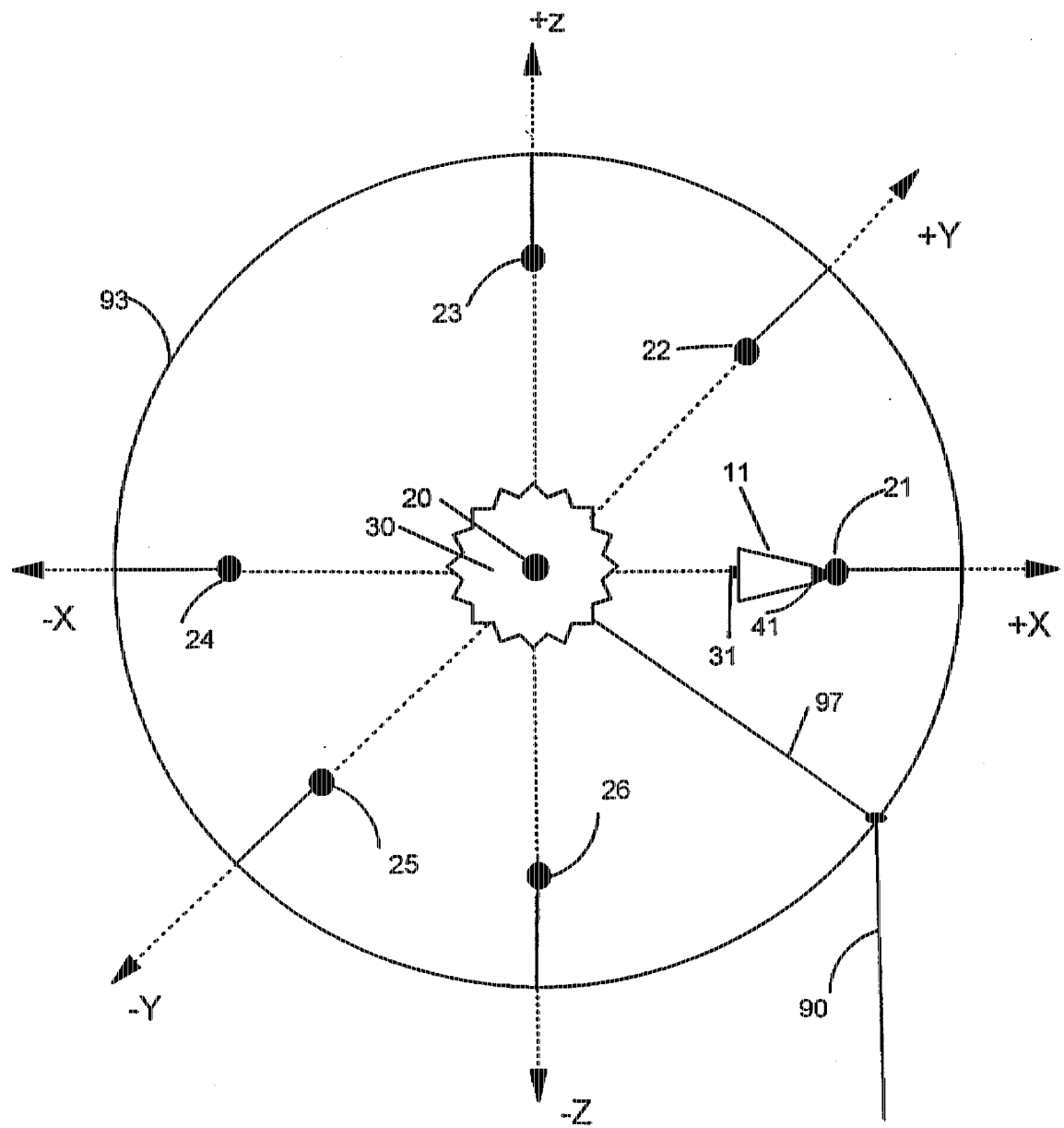
FIG. 5 shows a single camera as in the configuration shown in FIG. 4, except that the camera is pointed inward toward an object essentially at the reference point.

In the camera system 53 shown in FIG. 5, a single camera 41 is used just as in the configuration shown in FIG. 3, except that the camera is pointed inward toward the reference point 20. This would be useful to monitor any or all inward orthogonal views of an object 40 actually or essentially at the reference point 20. The object 40 could range in size from very small to very large. For large objects the camera 41 is positioned at such a distance from the reference point 20, which would enable the camera to monitor the entire view of the object 40 from each position 21-26.

Figure 6:
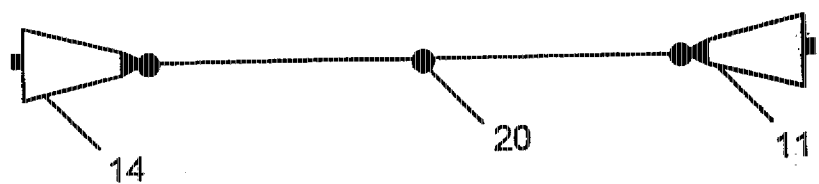
FIG. 6 shows a two-camera system configuration in accordance with the present invention.
Figure 7:
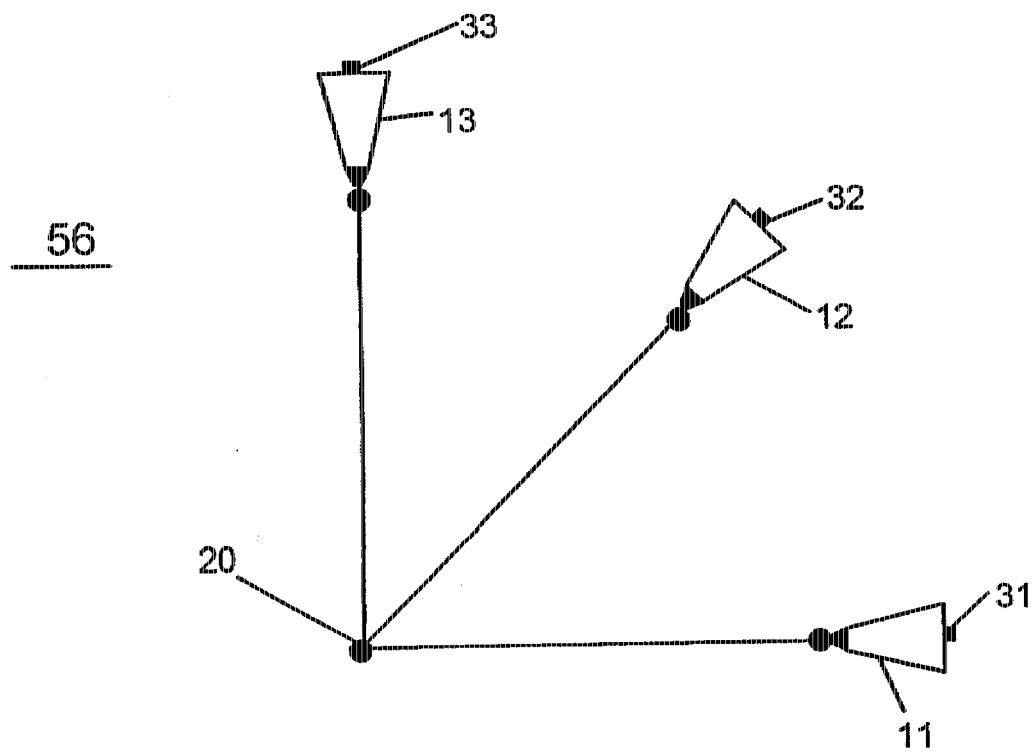
FIG. 7 shows a three-camera system configuration in accordance with the present invention.

Other camera system configurations are shown in FIGS. 6 and 7. FIG. 6 shows a two-position monitoring camera configuration 55 capable of simultaneous monitoring any two opposite positions from positions 21-26. The pair of cameras 11, 14 are moved according to the provider's application from any two opposite positions to any other two opposite position combination. FIG. 3 shows a three-position monitoring camera configuration 56. The three cameras 11-13 are most usually essentially at right angles to each other and are moved according to the provider's application desires from any three-position monitoring combination to any other three-position monitoring combination.

In one embodiment, the computer system 60 identifies the camera output of each particular camera based upon that camera's position. It marks each camera's image sequence in a way that enables the image sequence to be retrieved on the basis of the marking. All camera image sequences associated with each common reference point 20 are marked in a corresponding manner. A common continuum of reference points is generally marked sequentially. The marking could be further indexed relative to a time reference and/or application specific referencing indicators as described subsequently. All the so marked camera outputs are stored for subsequent retrieval. Preferably, camera output data is stored as digital data in an MPEG type compressed format in a manner known to those skilled in the art.

There are many ways known to those skilled in the art to form an application useful for a user. One method employs several marking parameters stored together with the camera output to enable a user to selectively view the specific desired application parts. Generally, each application consists of a group of application sequences. Each sequence corresponds to a time and/or space continuum of images. This may correspond to a particular first site area of interest. The second site area of interest would be another sequence, and so on. Each sequence is assigned a specific application sequence number to enable a user to call up that application sequence.

Within an application sequence, the camera system is moved from one reference point to another reference point. All the activated cameras continually monitor their field of view at each reference point. In order to enable and ascertain the alignment of all the camera outputs during display an index number is assigned to each reference point. The index number is common to all the cameras and is also stored with the camera data. It is also recommended to store a clock counter starting at zero incrementing every second of application monitoring duration. This provides the time elapsed since the application's beginning. In some applications it is also desirable to store the actual time of day at which the video data was gathered. Thus, a sequence number, index number, elapse time and actual time of day is desirably stored together with each one second of video data.

Figure 9:
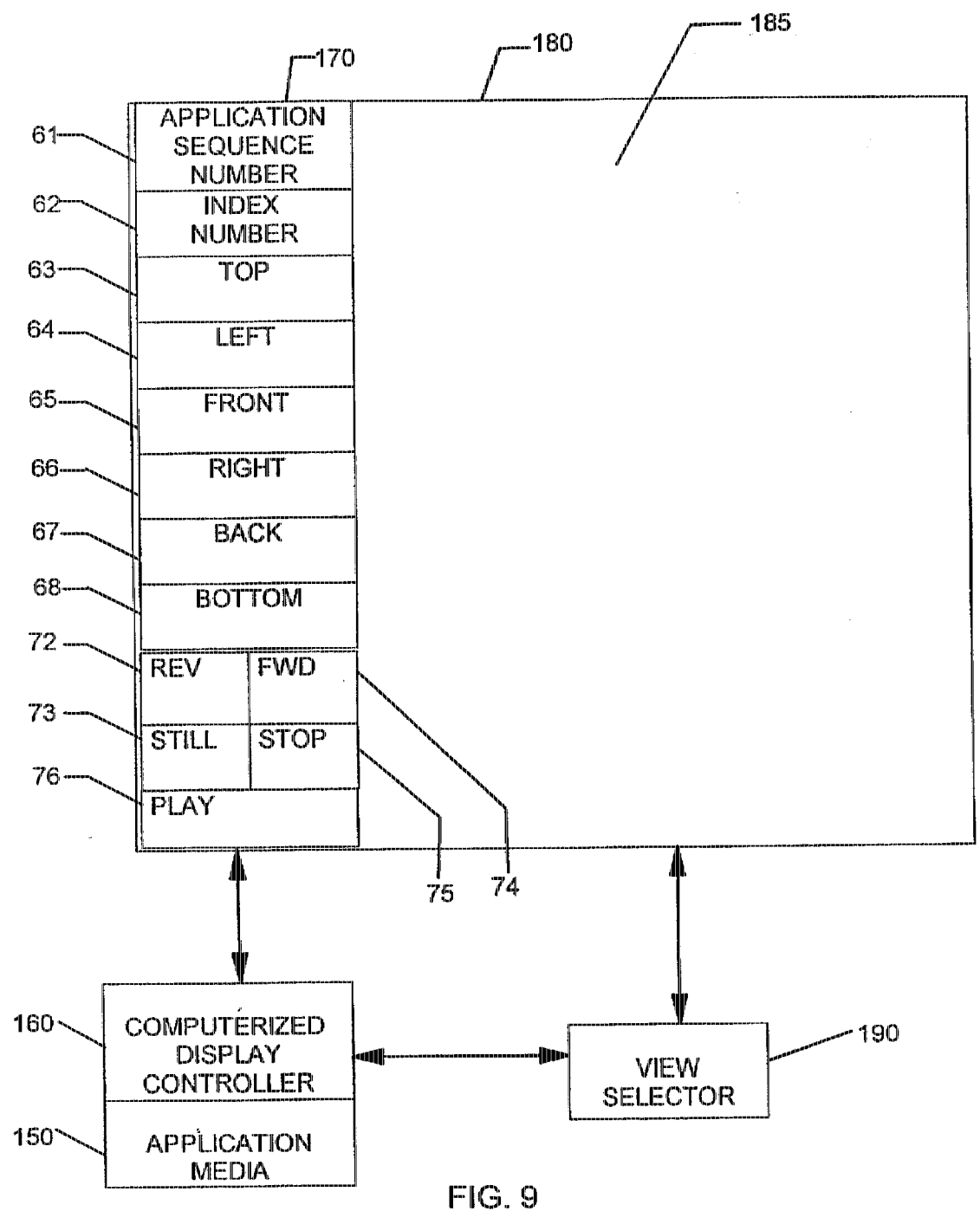
FIG. 9 shows a user control and switching display for the present invention.

FIG. 9 shows a typical storage and marking sequence for a six-position camera system 50. It is shown for a marking quantitization of one second. Each entry is shown in a different cell. Time is incremented from left to right. Thus, each cell contains an entry that corresponds with one second of video data. Each one second increment normally includes data for the number of frames that is equal to the frame rate in seconds of the particular camera system employed. Marking information could be stored in MPEG headers and/or independent storage registers referenced to the corresponding image sequence.

In the case shown in FIG. 9, storage marking cells are provided for the following:

Application sequence number 61;

Index number 62;

Top camera position 63;

Left camera position 64;

Front camera position 65;

Right camera position 66;

Back camera position 67;

Bottom camera position 68;

Monitoring time-of-day 69;

One second timing marker 71;

At each reference point 20 the data from all six camera positions 21–26 are all assigned the same marking index number. A portion of the cell markings for the 17th and 18th sequence of an application designated as an MS application, is marked MS17 and MS18 respectively. This is shown in FIG. 9 for the index number ranging from 5131 to 5135. The data marking from any camera position at each index number is differentiated from the data of a different position by a letter leading the index number in the cell, where T is for top, L for left, F for front, R for right, K for back and B for bottom. Thus L5133 is the marking for the left camera position data at index number 5133, and so on. The index number may change from second-to-second as it does when the timing marker changes from 6321 to 6323. At time 11:13:22 (13 minutes and 22 seconds past 11 AM) the roving vehicle stops moving causing the cameras to remain at the same reference location for two minutes. Therefore the index number does not change till the timing marker changes to 11:15:21 (15 minutes and 21 seconds past 11 AM). At timing marker 11:15:23 the application sequence number is changed to MS18 indicating the start of a new image sequence, and so on. The ditto marks in a cell indicate duplication of the previous marking. It does not necessarily indicate that the stored image data is not changing during this timing increment. A cell shown with a double arrow indicates a sequentially changing marking.

The marking information may be used for retrieval of a particular camera position's stored image data. In the absence of any user selected starting point for application viewing, the application would desirably start at its beginning at a time elapsed indication of '0000'. It shows the front position camera's image data sequentially starting with the first application sequence and the first index number. Once a user selects the image sequence of a particular camera position, the display shows the continuing sequences of that camera position. The user can also switch from that camera position to display the image sequences of any other available camera position in a sequence contiguous manner. Use of the application so marked requires a compatible display procedure that enables a user to view and/or listen to the entire or selected portions of the formed application. The procedure is herein referred to as an application using procedure.

An application using procedure, including a user control and switching display procedure, can be implemented in many ways known to those skilled in the art. One desirable implementation is shown in FIG. 9. FIG. 9 shows an application 150 connected to a computerized display controller 160. The display controller 160 controls the display 180. User selection may be made accessible via a view selector 190 such as a mouse, a keyboard, a remote controller or in any manner known to those skilled in the art. Thus, even though a mouse is assumed in the description that follows any other selection system may be employed to provide the desired results. The user powers 'ON' the application 150 and, selects a starting position by setting and clicking the mouse at a desired camera position display menu 170 shown on the left side of the display means (screen, terminal etc.) 185. If not all six camera positions are available, only the available camera positions are highlighted on the menu 170. The actual camera position, selected from the six available positions 63–68, being displayed is brightly highlighted. The actual application sequence number, index number of the image being displayed is continuously updated and displayed on the menu 170 as the application is being viewed. The user clicks the application number, the index number or a camera position to change its setting. When the user clicks on a position that was not brightly highlighted, the display switches to that position and that position becomes brightly highlighted. When the user sets or clicks on the application number 61, the index number 62 and then clicks on the fast forward indicator 74 or the rewind indicator 72 the application number or index number follows the command until the user sets and clicks the stop button 75. While viewing any selected camera position selected from any of the up to six available positions 63–68, any standard video player function command may be employed in their usual functional control manner. This is accomplished by clicking on the corresponding indicator for REWIND 72, STILL 73, FAST FORWARD 74, STOP 75, and PLAY 76.

Figure 10:
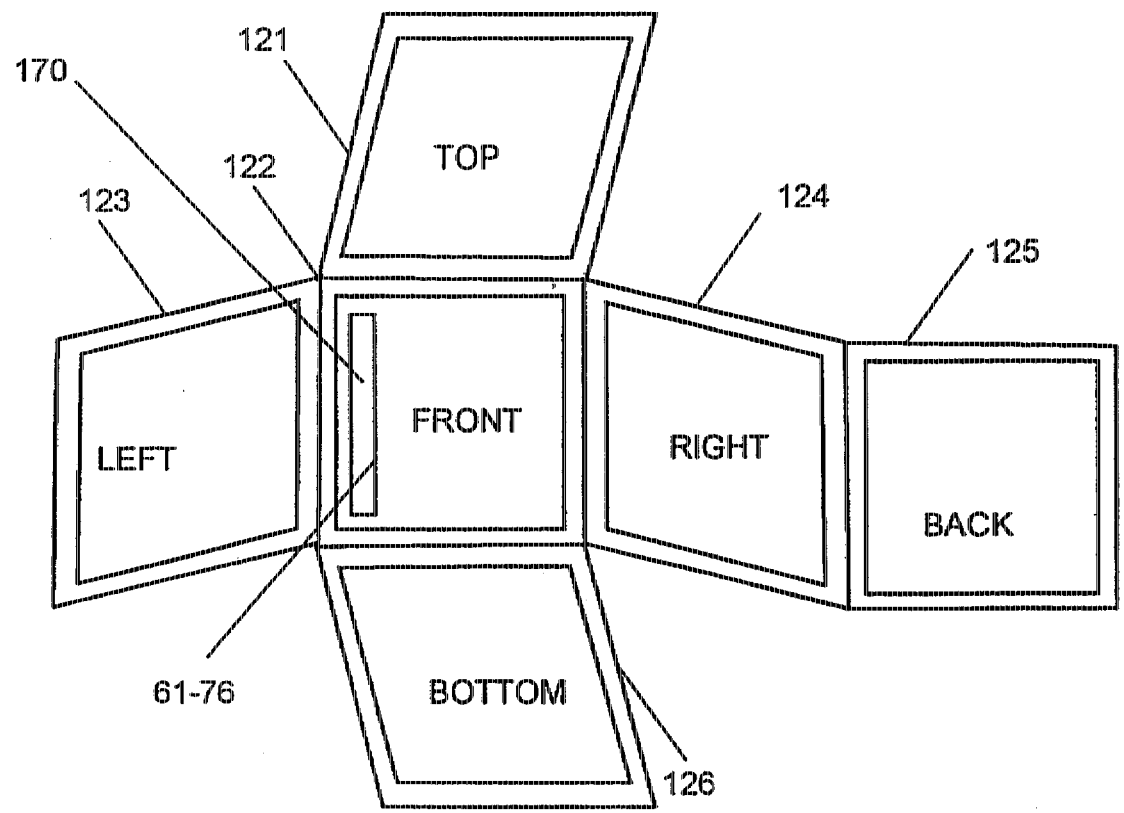
FIG. 10 shows a six-view display system in accordance with the present invention.

FIG. 10 shows an optional display system. This display system enables a viewer to view up to six concurrent displays 121–126 of the data stored for all six camera positions. For a case where all six views are made available: The top view is displayed on display 121; the front view is displayed on display 122; the left view is displayed on display 123; the right view is displayed on display 124; the back view is displayed in display 125; and the bottom view is displayed on display 126. Although FIG. 10 shows a particular placement for the six displays, there are many different placements possible for the six displays relative to a viewer and or relative to each other. In this system it is preferable that the user function control for rewind 72, still 73, fast forward 74, stop 75, and play 76 function in synchronism for all the displayed positions. Thus all displays would show the data corresponding to their respective position with a common sequence number, index number and time elapsed indication. The function control display menu 170 is preferably located only in the display showing the front camera position. A more complex embodiment would allow separate functional controls for each of the separate displays. This could be accomplished by providing a separate user procedure of the type shown in FIG. 9 for each display. In each display its corresponding display position indicator is preferably locked to continuously highlight its corresponding camera position. An alternate embodiment enables a multiplicity of camera outputs shown in FIG. 10, to be viewed on single, preferably large, display screen.

The six camera positions are positioned relative to each other in a manner in which the entire three-dimensional omni-directional viewing environment from each reference point is covered by the six positions. In this configuration the total viewing environment is essentially segmented into the six faces of a six sided polyhedron. Thus, each position displays the environment encompassing the viewing environment covering one of the six faces. Preferably, but not necessarily the polyhedron is a cube so that the environment is divided equally among the six camera positions.

In order for a user to move smoothly from viewing one camera's output to viewing an adjacent camera's output it is preferable that the input field of view of one camera does not overlap the input field of view of an adjacent camera. In practice there is usually overlap of input field's of view. The overlap is generally not a significant problem in so much that it is not apparent when continuously viewing one camera position's output. It causes only a momentary glitch at the instant of switching from the output of one camera position to the output of another camera position. It is however relatively important to make certain that there not be a significant gap between adjacent viewing fields.

In some cases it is advantageous to employ a method to minimize the overlap of the adjacent camera's input fields of view. This can be accomplished by clearly setting the camera inputs to cover specifically defined non-overlapping input fields of view. This is accomplished by using a physical delineator of the field of view. An embodiment of a physical delineator of the input field of view is the cubic wire cage 200 shown in FIG. 1. The wire cage 200 is mounted to surround the cameras 11–16. The wire cage 200 had a generally cubic form to provide a wire face for each camera position. The wire cage concept is used to provide a clear delineation of each camera's field of view. As such, it is useful with any camera system. The wire cage is generally placed essentially symmetrically with respect to the camera positions and the reference point 20. Each face of the wire cage 200 is placed away from and essentially central to, and perpendicular to the central line of site of the camera it faces. The wire cage's faces are open (see through), with each face being defined by its surrounding wire-like material. It is preferable that each camera be set to monitor as closely as practical only the area included in one of these faces. The wires normally have a diameter of less than a quarter of an inch, and preferably less than a sixteenth of an inch so as not to block the viewing area and not to be apparent to the application user. Preferably, the wire cage is of a color that is later optically filtered out from the camera outputs. In one embodiment the wire has color bands of a regularly alternating, easily discernable color group. This includes repetitions of the three primary colors. A preferred mode is to have the computer automatically seek out the wire edges and set the camera zoom such that each camera's input field of view essentially includes the face defined by the wire face corresponding to that camera.

Figure 11:
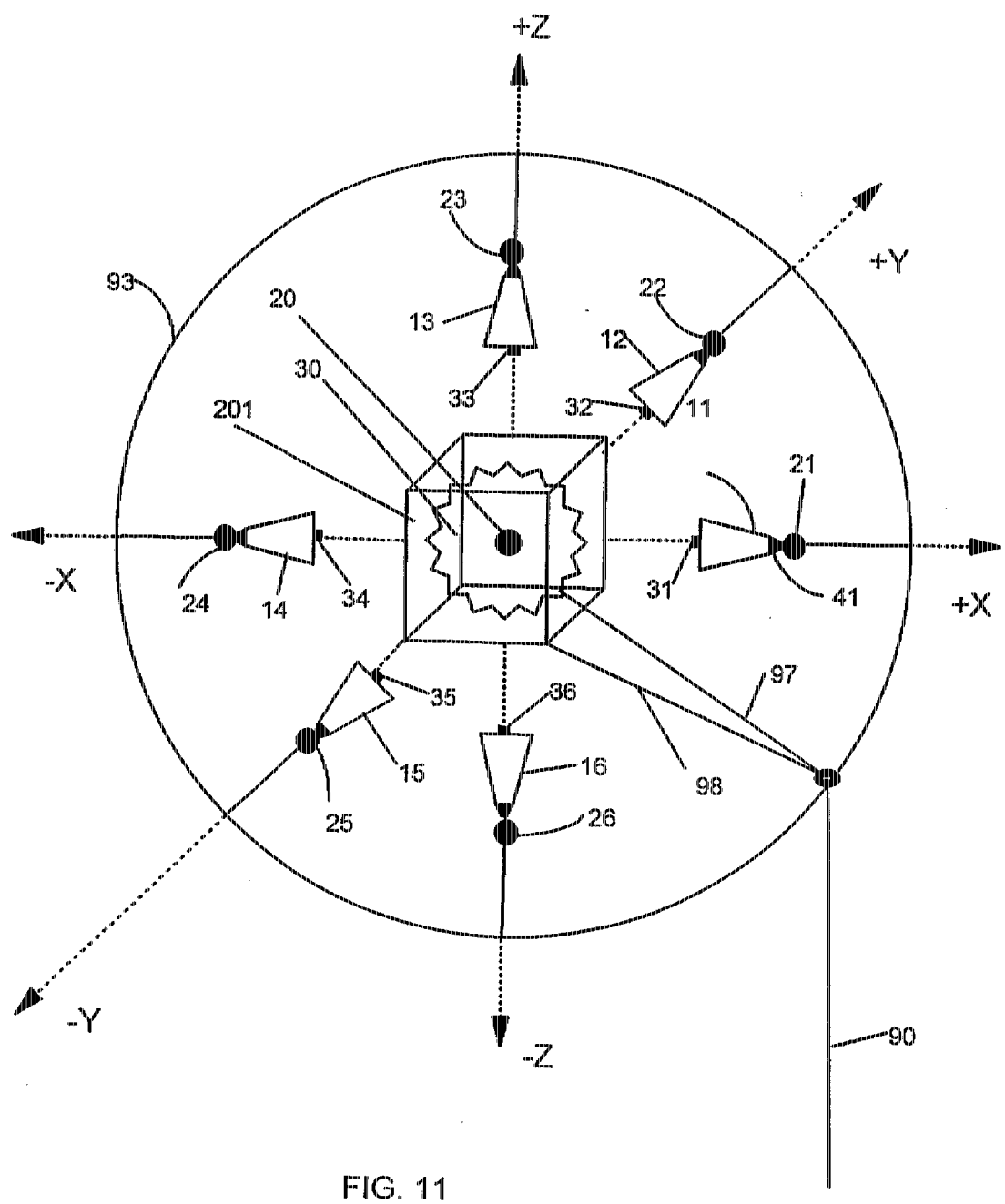
FIG. 11 shows an inwardly directed telepresence camera system including a wire cage in accordance with the present invention.

FIG. 11 shows a wire cage placed inward of an inwardly directed camera arrangement. This inner wire cage 201 surrounds the object of interest, and is used to define and set the viewing environment of each camera position. This would be a means to limit overlap between adjacent inward looking camera positions and to ascertain that complete coverage is actually obtained.

Figure 12:
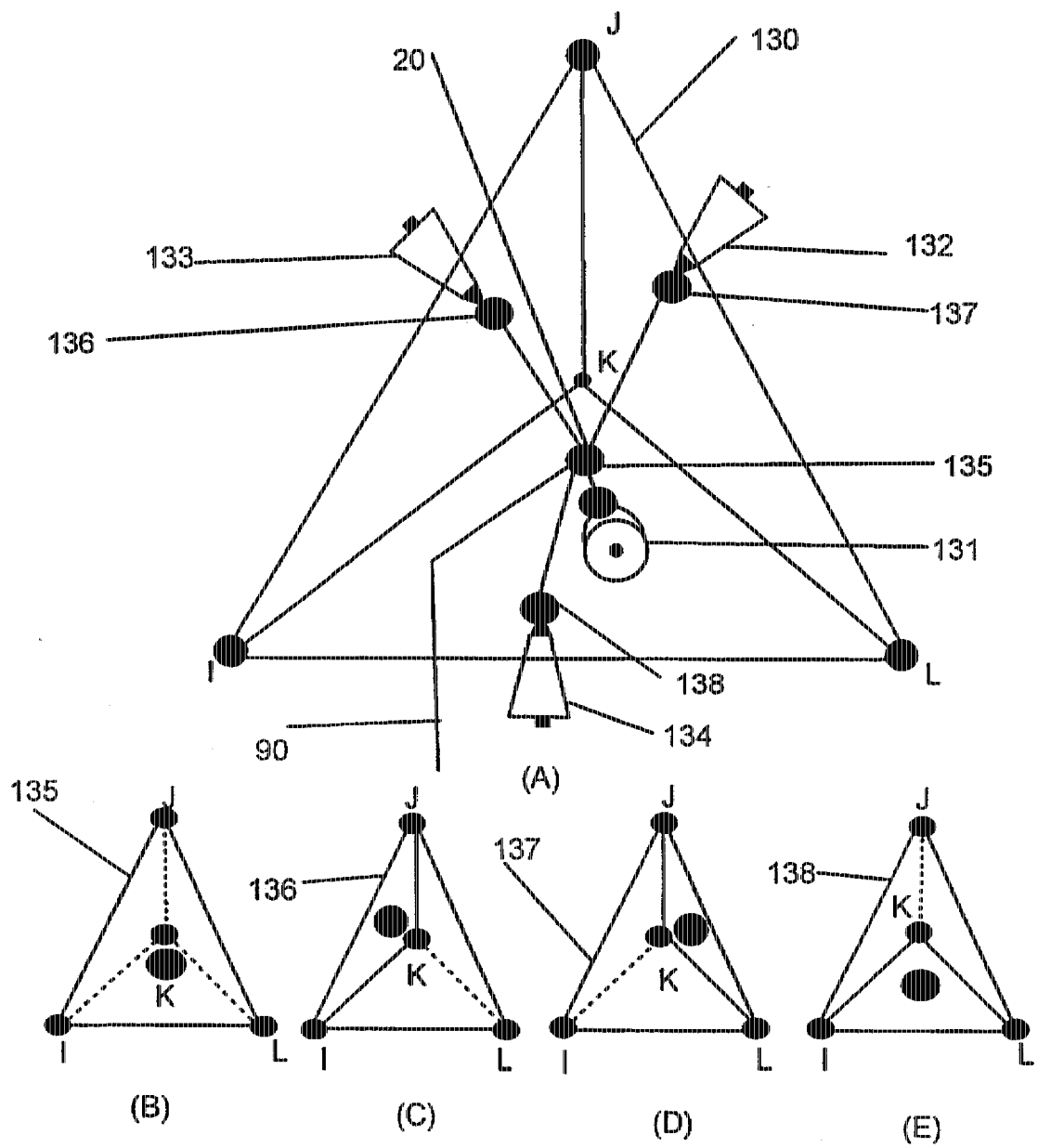
FIG. 12 shows a quadrahedron camera positioning configuration in accordance with the present invention.

In so much that the prevalent displays provide a rectangular view, the six-position camera system provides the most easily useable and operable viewing environment. In actuality any polyhedron can be used for implementing the invention. Setting up a camera system to view the faces corresponding to the sides of a quadrahedron 130 shown in FIG. 12a enables the provider to cover the entire three-dimensional omni-directional viewing environment with only four cameras 131–134 at positions 135–138. The reference point 20 of camera system 57 is essentially at the center of the quadrahedron 130. The front position field of view 135 included in face IJL is highlighted in FIG. 12b. The left position 136 field of view included in IJK is highlighted in FIG. 12c; the right position 137 field of view included in face JKL is highlighted in FIG. 12d; and the bottom position 138 field of view included in face IKL is highlighted in FIG. 12e. This type of a camera position setting is most useful for an application formed by a camera system mounted an aircraft's underside. An appropriate ground based four-position camera system is obtained by flipping the quadrahedron along a vertical axis such that the bottom field of view of FIG. 12e becomes a top field of view.

Figure 13:
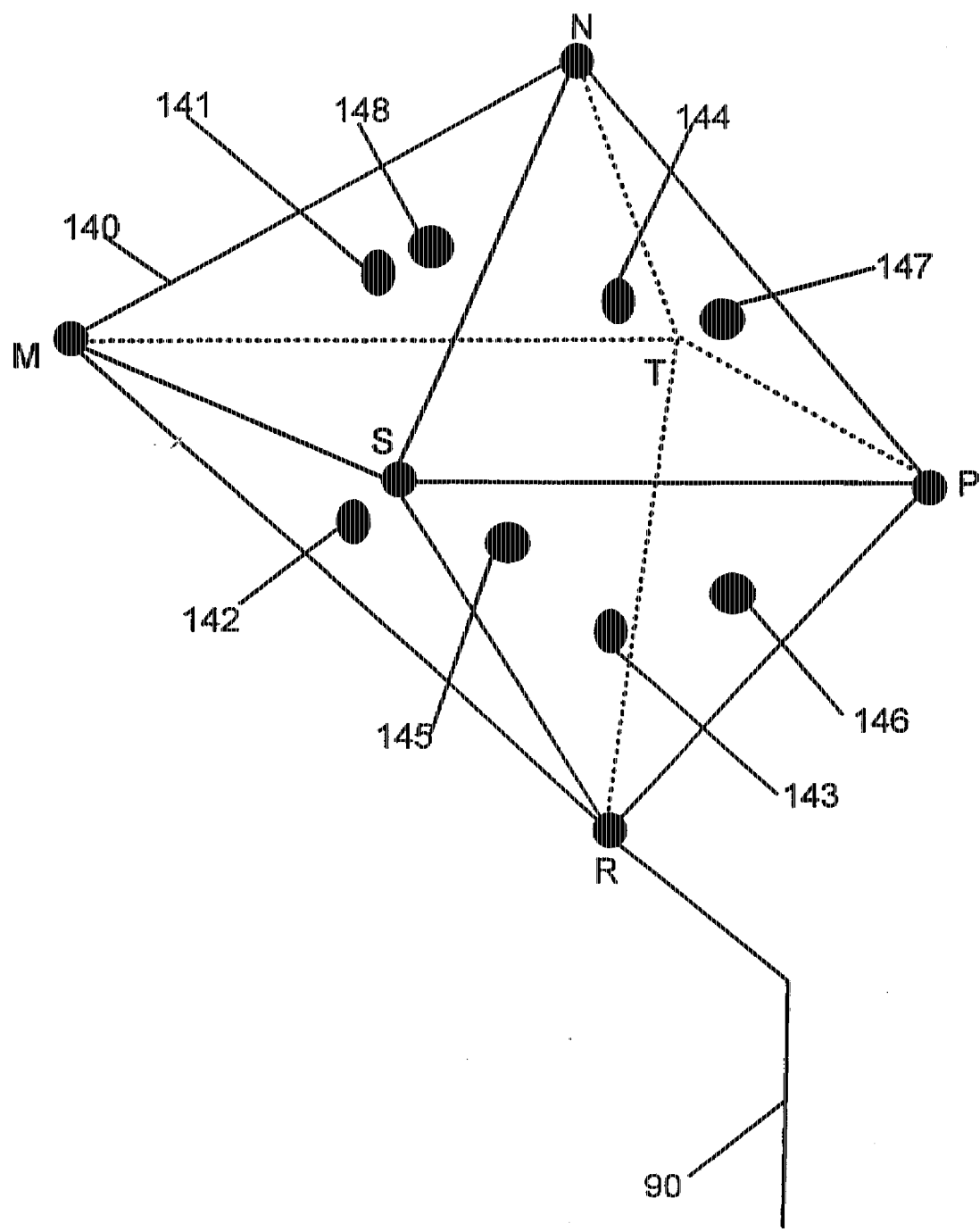
FIG. 13 shows an octohedron camera positioning configuration in accordance with the present invention.

FIG. 13 shows the positioning of an octohedron camera system 58 which requires up to eight cameras at each of the eight camera positions 141–148. It is recommended that each camera position 141–148 be made available for mounting a camera on a hollowed octohedron 140 as shown in FIG. 13. The hollowed octohedron 140 has corners at M, N, P, R, S and T. Position 141 is substantially at the center of face MNS. Position 142 is substantially at the center of face MSR. Position 143 is substantially at the center of face PRS. Position 144 is substantially at the center of face NPS. Position 145 is substantially at the center of face MTR. Position 146 is substantially at the center of face PRT. Position 147 is substantially at the center of face NPT. Position 148 is substantially at the center of face MNT. An outwardly directed single camera may be moved from position to position to get all eight camera position input fields of view. Both the quadrahedron and the octohedron are employable with a triangular camera field of view and display. These would be most useful in telepresence simulations desiring the special effects resulting from these reduced or increased number of camera positions.

A wire cage scheme could be used in a camera system having any number of camera positions. Thus, for a quadrahedron camera system the wire cage would have four open faces formed with six wire edges. An octohedron would require a wire cage with eight faces, and so on.

In all these cases, portions of stored data from the multiplicity of camera positions from an application are desirably made available to a user for viewing according the user's desire and selection. User selection can be in real time by using a control and switching procedure described previously. The user could view any of the camera position outputs and switch between the available outputs so as to simulate viewing the viewing environment of forward, rightward, left-ward, backward, upward and downward. While viewing a particular application and switching to scenes from different cameras, the user could use the standard VCR type viewing functions of play, still, stop, rewind/reverse, fast forward etc. Generally, when the application involves moving images, the user is expected to view a combination of many viewing sequences in the monitoring time sequence. With the subject invention, this would be doable with the added ability to switch from camera position to camera position when ever the user so desires.

In some cases it is desirable for an editor or user to choose and specify the entire portion of the application to be viewed subsequently. This can be accomplished by using the markings stored with the application sequences. The application provider, editor or user may form one or more telepresence applications from the stored data by combining selected specific, or a continuum, or a multiplicity of continuum views or image sequences. The provider would generally switch between data received from one camera position to data received from an adjacent position to form a desired total application.

Although specific camera system and telepresence system configurations and methods of operation have been described, it is recognized that other configurations may be employed to essentially implement the present inventive apparatus and methods. For example, the wire cage system is useable with any multiple camera system and the camera systems are useable with any multiple position camera application.

What is claimed is:

1. A camera apparatus comprising:
   a plurality of cameras,
   each of said cameras having a camera input, and a camera output, and being positioned at a position to monitor a viewing portion of a total field of view, said viewing portion of each camera of said plurality of cameras being space-contiguous with the viewing portion of at least one other camera of said plurality of cameras;
   a processing device having means for receiving, marking and storing said camera output of each of said cameras; and
   a wire cage surrounding said cameras and having a plurality of wire faces, each of said wire faces being positioned opposite to said input of one of said cameras, wherein said cameras are movable with respect to and independent of said wire cage and each of said wire faces defines said viewing portion of said input of one of said plurality of cameras for making said camera output.

2. An apparatus as recited in claim 1 wherein said wire cage is formed with wire having a diameter of one eighth of an inch.

3. An apparatus as recited in claim 1 wherein said wire cage is formed with wire-like material having repeated color bands of red, blue and yellow.

4. An apparatus as recited in claim 3 wherein said processing device recognizes said repeated color bands from which it determines a desired viewing portion for each of said cameras.

5. A camera apparatus comprising:
   a plurality of cameras,
   each of said cameras having a camera input, and a camera output, and being positioned at a position to monitor a viewing portion of a total field of view, said viewing portion of each camera of said plurality of cameras being space-contiguous with the viewing portion of at least one other camera of said plurality of cameras; and
   a processing device having means for receiving, marking and storing said camera output of each of said cameras, wherein said cameras are positioned to surround an object being viewed, and said input of each of said cameras is positioned to look inward towards said object, and
   a wire cage surrounding said object and being surrounded by said cameras wherein said cameras are movable with respect to and independent of said wire cage, and said wire cage has a plurality of faces, with each of said faces being positioned essentially opposite to said input of one of said cameras, and wherein each of said faces defines said viewing portion of each of said cameras for marking said camera output.

6. An apparatus as recited in claim 5 wherein said wire cage has a wire periphery, said wire periphery including at least one image plate, said image plate being included in at least one of said viewing portions.

7. A view monitoring method employing a plurality of cameras having a total field of view, each of said cameras having a camera input, said method comprising the steps of:
   positioning each of said cameras to monitor at said input a viewing portion of said total field of view such that each said viewing portion is space-contiguous with the viewing portion of at least one other of said cameras;
   mounting said plurality of cameras such that in an XYZ rectangular coordinate system at least one said viewing portion is essentially facing an X-Y plane, a second viewing portion is essentially facing an X-Z plane, and a third viewing portion is essentially facing the Y-Z plane;
   surrounding said cameras with a wire cage having a plurality of wire faces;
   positioning one of said wire faces substantially opposite to said input of each of said cameras wherein said cameras are movable with respect to and independent of said wire cage and each of said wire faces identifies a different viewing portion; and
   setting said viewing portion of said input of each of said cameras in correspondence with one of said wire faces for marking said camera input.

8. A view monitoring method employing a plurality of cameras having a total field of view, each of said cameras having a camera input, said method comprising the steps of:
   positioning each of said cameras to monitor at said input a viewing portion of said total field of view such that each said viewing portion is space-contiguous with the viewing portion of at least one other of said cameras;

mounting said plurality of cameras such that in an XYZ rectangular coordinate system at least one said viewing portion is essentially facing an X-Y plane, a second viewing portion is essentially facing an X-Z plane, and a third viewing portion is essentially facing the Y-Z plane, in which said total field of view includes an object surrounded by said cameras, and said input of each of said cameras is positioned to look inward toward said object;

surrounding said object with a wire cage mounted between said object and said cameras, said wire cage having a plurality of faces;

positioning each of said faces opposite to said input of one of said plurality of cameras wherein said cameras are movable with respect to and independent of said wire cage; and setting said viewing portion of said input of each of said cameras in correspondence with one of said faces for marking said camera input.

9. A method as recited in claim 8 wherein said wire cage has a wire periphery, said wire periphery including at least one image plate, said image plate being included in at least one of said viewing portions.

* * * * *